(12) United States Patent
Brizius

(10) Patent No.: US 8,859,707 B2
(45) Date of Patent: Oct. 14, 2014

(54) TWO-COMPONENT LIGNOSULFONATE ADHESIVES AND METHODS FOR THEIR PREPARATION

(75) Inventor: Glen Leon Brizius, Augusta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 73 days.

(21) Appl. No.: 13/509,321

(22) PCT Filed: Mar. 20, 2012

(86) PCT No.: PCT/US2012/029794
§ 371 (c)(1),
(2), (4) Date: May 11, 2012

(87) PCT Pub. No.: WO2013/141848
PCT Pub. Date: Sep. 26, 2013

(65) Prior Publication Data
US 2013/0248111 A1 Sep. 26, 2013

(51) Int. Cl.
*C09J 197/00* (2006.01)
(52) U.S. Cl.
USPC .................. 527/400; 156/331.1; 524/609
(58) Field of Classification Search
CPC ....... C09J 197/00; C09J 197/02; B32B 37/12; C07G 1/00
See application file for complete search history.

(56) References Cited

U.S. PATENT DOCUMENTS

| | | | |
|---|---|---|---|
| 2,462,252 A * | 2/1949 | Booty ............................ | 156/335 |
| 3,617,429 A * | 11/1971 | Le Blanc ....................... | 428/182 |
| 3,658,638 A * | 4/1972 | Ludwig et al. ................ | 428/529 |
| 3,957,703 A | 5/1976 | Ludwig et al. | |
| 3,994,850 A | 11/1976 | Willegger et al. | |
| 4,279,788 A | 7/1981 | Lambuth | |
| 4,446,246 A | 5/1984 | McGinniss | |
| 4,486,557 A | 12/1984 | Gaul et al. | |
| 4,564,649 A | 1/1986 | Hume, III et al. | |
| 4,607,082 A | 8/1986 | McGinniss | |
| 4,608,111 A | 8/1986 | Hume, III et al. | |
| 4,638,035 A | 1/1987 | McGinniss | |
| 4,702,496 A | 10/1987 | Hume, III | |
| 5,281,434 A * | 1/1994 | Winowiski et al. ........... | 426/635 |
| 5,717,031 A | 2/1998 | Degen et al. | |
| 5,973,036 A * | 10/1999 | Matzinger et al. .............. | 524/31 |
| 2002/0065400 A1* | 5/2002 | Raskin et al. .................. | 530/500 |
| 2004/0044138 A1* | 3/2004 | Aranguiz et al. .............. | 525/314 |
| 2009/0088535 A1* | 4/2009 | Arita et al. ..................... | 525/390 |
| 2010/0099793 A1* | 4/2010 | Wunder ......................... | 523/122 |
| 2010/0151253 A1* | 6/2010 | Roth et al. ..................... | 428/413 |
| 2010/0179272 A1* | 7/2010 | Balzarek et al. ............... | 524/503 |
| 2010/0331462 A1 | 12/2010 | Levandoski et al. | |
| 2011/0257682 A1* | 10/2011 | Hadba et al. .................. | 606/213 |
| 2013/0098550 A1* | 4/2013 | Sargeant et al. ............ | 156/331.6 |
| 2013/0178576 A1* | 7/2013 | Crandall et al. .............. | 524/555 |
| 2013/0248111 A1* | 9/2013 | Brizius, Glen Leon ... | 156/331.1 |

FOREIGN PATENT DOCUMENTS

| | | |
|---|---|---|
| BR | 7700008 A | 9/1977 |
| CA | 1062827 A1 | 9/1979 |
| DE | 2700337 A1 | 7/1977 |
| EP | 0159886 A2 | 10/1985 |
| EP | 0260797 A2 | 3/1988 |
| FI | 1770017 A | 7/1977 |
| FR | 2337150 A1 | 7/1977 |
| GB | 1515821 A | 6/1978 |
| JP | 52098086 A | 8/1977 |
| JP | 59089304 A | 5/1984 |
| SE | 7614535 A | 7/1977 |
| WO | WO2011/002876 A2 | 1/2011 |

OTHER PUBLICATIONS

International Search Report and Written Opinion for PCT/US2012/029794 dated Apr. 20, 2012.
ABC' s of Biofuels, Biomass Program—Information Resources, U.S. Department of Energy http://www1.eere.energy.gov/biomass/m/abcs_biofuels.html [Printed from Internet May 7, 2012].
Antoni et al., A chemoselective approach for the accelerated synthesis of well-defined dendritic architectures, *Chemical Communication* (May 14, 2007), 22:2249-2251.
BioFuels Basics, National Renewable Energy Laboratory: Learning About Renewable Energy http://www.nrel.gov/learning/re_biofuels.html?print [Printed from Internet Apr. 30, 2012].
Black, Low-Emitting Green Adhesives Bring Improvement to Indoor Air Quality (May 1, 2009) http://www.adhesivemag.com/articles/print/87614.
Crude Oil and Commodity Prices http://www.oil-price.net [Printed from Internet Apr. 30, 2012].
Deepwater Horizon Oil Spill http://en.wikipedia.org/wiki/Deepwater_Horizon_oil_spill [Apr. 30, 2012].
Haars et al., Room-Temperature Curing Adhesives Based on Lignin and Phenoloxidases, *Adhesives from Renewable Resources, ACS Symposium Series* (Dec. 31, 1989), 385:126-134.
Holladay et al., Top Value-Added Chemicals From Biomass, vol. II—Results of Screening for Potential Candidates from Biorefinery Lignin, Pacific Northwest National Laboratory, Prepared for the U.S. Department of Energy, Oct. 2007.
Indoor Air: An Introduction to Indoor Air Quality (IAQ); Volatile Organic Compounds (VOCs), United States Environmental Protection Agency (Apr. 10, 2012) http://www.epa.gov.iaq.voc.html.
Lane, Lignin: make less, or make more of it, a Digest special report, *Biomass Digest* (Jun. 17, 2010) http://biomassdigest.net/blog/2010/06/17/lignin-make-less-or-make-more-of-it-a-digest-.
McKendry, Energy production from biomass (part 3): gasification technologies, *Bioresource Technology* (May 2002), 83(1):55-63.

(Continued)

*Primary Examiner* — Michael Pepitone
*Assistant Examiner* — Michael A Salvitti
(74) *Attorney, Agent, or Firm* — Pepper Hamilton LLP

(57) ABSTRACT

Disclosed are two-component lignosulfonate adhesives, methods of synthesizing two-component lignosulfonate adhesives, kits comprising two-component lignosulfonate adhesives and methods of using two-component lignosulfonate adhesives.

32 Claims, No Drawings

(56) References Cited

OTHER PUBLICATIONS

Peng et at, Application of Click Chemistry in the Fabrication of Cactus-Like Hierarchical Particulates for Sticky Superhydrophobic Surfaces, *J. Phys. Chem. C* (Mar. 10, 2010), 114(13):5926-5931.

Qin et al., Click Polymerization: Progress, Challenges and Opportunities, *Macromolecules* (Sep. 28, 2010), 43(21):8693-8702.

Rostovtsev et al., A Stepwise Huisgen Cycloaddition Process: Copper (I)-Catalyzed Regioselective "Ligation" of Azides and Terminal Alkynes, *Angewandte Chemie International Edition* (Jul. 15, 2002), 41(14):2596-2599.

Soy Inks and Adhesives: Cost Savings and Environmental Assurance http://soynewuses.org/printing-inks-adhesives/ [Printed from Internet Apr. 30, 2012].

Tang et al., Synthesis and Curing of Hyperbranched Poly(triazole)s with Click Polymerization for Improved Adhesion Strength, *Applied Materials & Interfaces* (Feb. 8, 2010), 2(2):566-574.

Tornøe et al., Peptidotriazoles on Solid Phase: [1,2,3]-Triazoles by Regiospecific Copper(I)-Catalyzed 1,3-Dipolar Cycloadditions of Terminal Alkynes to Azides, *J. Org. Chem.* (Apr. 2, 2002), 67(9):3057-3064.

Volatile Organic Compounds: Health Effects Fact Sheet, Nov. 2000.

Williams, Cellulosic Ethanol and Power Plant Co-Locations: Savings in Synergy, *Ethanol Producer* (Jun. 10, 2010) http://ethanolproducer.com/articles.

Understanding Low Outgassing Adhesives, OptoIQ, accessed at http://web.archive.org/web/20110123110506/http://www.optoiq.com/index/whitepapers/whitepaper-display/5937215193/whitepapers/laser-focus-world/general/understanding-low.html, accessed on Jan. 29, 2014, pp. 1.

Diaz, et al., Click chemistry in materials synthesis. 1. Adhesive polymers from copper-catalyzed azide-alkyne cycloaddition, *Journal of Polymer Science, Part A*, (2004), 42(17):4392-4403.

Dumitrescu et al., Wood Adhesives Based on Lignocellulosic Materials, *Annals of DAAAM & Proceedings* (2009), pp. 577-578.

\* cited by examiner

TWO-COMPONENT LIGNOSULFONATE ADHESIVES AND METHODS FOR THEIR PREPARATION

CLAIM OF PRIORITY

This application is a U.S. national stage filing under 35 U.S.C. §371 of International Application No. PCT/US2012/029794 filed Mar. 20, 2012 entitled "Two-component lignosulfonate adhesives and methods for their preparation".

FIELD

This disclosure relates to two-component lignosulfonate adhesives, methods of synthesizing two-component lignosulfonate adhesives, kits comprising two-component lignosulfonate adhesives and methods of using two-component lignosulfonate adhesives.

BACKGROUND

Adhesives are used whenever two or more materials are designed to be joined by cohesion bonding and surface adhesion. Adhesives are commonly used in most non-food consumer products and are fundamental to the manufacturing of these products.

Many commonly used adhesives are of petroleum-derived feedstock molecules such formaldehyde, phenol and methylene diisocyanate. These chemicals are both toxic to humans and animals and are volatile, easily making their way into the air contributing to indoor air pollution. Formaldehyde, for example is classified as a carcinogen. Furthermore, petroleum-based adhesives often require solvents for distribution. Examples of these solvents include methylene chloride, toluene and trichloroethane. As these adhesives set, the solvents are given of as volatile organic compounds (VOCs). VOCs are a significant contributor to both indoor air pollution as well as water supply pollution around the world. Water-based (water soluble) adhesives represent an attractive alternative to petroleum-based adhesives, as water is inherently nontoxic, non-flammable, and safe to handle. Moreover, preparation of such an adhesive can be derived almost entirely from natural/renewable sources which do not produce VOCs upon curing. Accordingly, non-toxic adhesives that will reduce VOC emission are desirable.

SUMMARY

Some embodiments are directed to a polymeric adhesive comprising: a first functionalized lignosulfonate monomer comprising a plurality of first functional groups; a second functionalized lignosulfonate monomer comprising a plurality of second functional groups; wherein the plurality of first functional groups crosslink with the plurality of second functional groups to form the polymeric adhesive.

Some embodiments are directed to a kit for a two-part adhesive comprising: a first container housing a first monomeric solution, the first monomeric solution comprising: a first functionalized lignosulfonate monomer, the first functionalized lignosulfonate monomer comprising a plurality of alkynyl ether functional groups; and a first component of a two-component catalyst system; and a second container housing a second monomeric solution, the second monomeric solution comprising a second functionalized lignosulfonate monomer, the second functionalized lignosulfonate monomer comprising a plurality of alkyl azide functional groups; and a second component of a two-component catalyst system; wherein the first monomeric solution and the second monomeric solution are kept separate until desired and upon mixing, crosslink to form an adhesive.

Some embodiments are directed to a method of synthesizing a lignosulfonate-based adhesive, the method comprising: preparing a first monomeric solution by mixing a first functionalized lignosulfonate monomer having a plurality of alkynyl ether functional groups with a first component of a two-component catalyst system; preparing a second monomeric solution by mixing a second functionalized lignosulfonate monomer having a plurality of alkyl azide functional groups with a second component of a two-component catalyst system; and maintaining the first monomeric solution and the second monomeric solution separately from one another until adhesion is desired.

Some embodiments are directed to a method of adhering a first surface to a second surface, the method comprising: combining a first monomeric solution with a second monomeric solution to form a mixture; applying the mixture to the first surface; contacting the second surface with the mixture on the first surface; and allowing the mixture to cure thereby adhering the first surface to the second surface.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the present disclosure, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the FIGURE, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

While various compositions, methods and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

Some embodiments are directed to a polymeric adhesive comprising: a first functionalized lignosulfonate monomer comprising a plurality of first functional groups; a second functionalized lignosulfonate monomer comprising a plurality of second functional groups; wherein the plurality of first functional groups crosslink with the plurality of second functional groups to form the polymeric adhesive.

In some embodiments, the plurality of first functional groups comprises alkynyl ethers, each independently of formula: —O—$(CH_2)_n$—C≡C—H, wherein n is an integer from 1 to 20; and the plurality of second functional groups comprises an alkyl azide, each independently of formula: —O—$(CH_2)_m$—$N_3$, wherein m is an integer from 2 to 20. In some embodiments, n is from 1 to 10, or 1 to 5, or 1 to 3. In some embodiments, n=1, n=2, n=3, n=4, n=5, n=6, n=7, n=8, n=9, n=10, n=11, n=12, n=13, n=14, n=15, n=16, n=17, n=18, n=19, or n=20. In some embodiments, m is from 2 to 10, or 2 to 5, or 2 or 3. In some embodiments, m=1, m=2, m=3, m=4, m=5, m=6, m=7, m=8, m=9, m=10, m=11, m=12, m=13, m=14, m=15, m=16, m=17, m=18, m=19, or m=20. In some embodiments, n=1 and m=2.

The biofuel and paper industries produce large amounts of biomass waste in the form of five and six carbon sugars as well as vast amounts of waste products such a lignin. Lignin is a highly cross-linked, heavily aromatic, polymeric product that has little value to these industries, and as such is treated as a waste material. Lignin represents an inexpensive biopolymer that is rich with functional groups made up of phenols and primary and secondary alcohols, as seen in the exemplary generic lignin structure below:

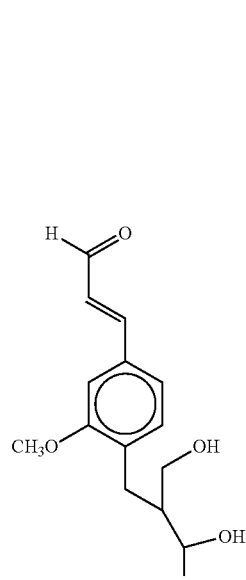
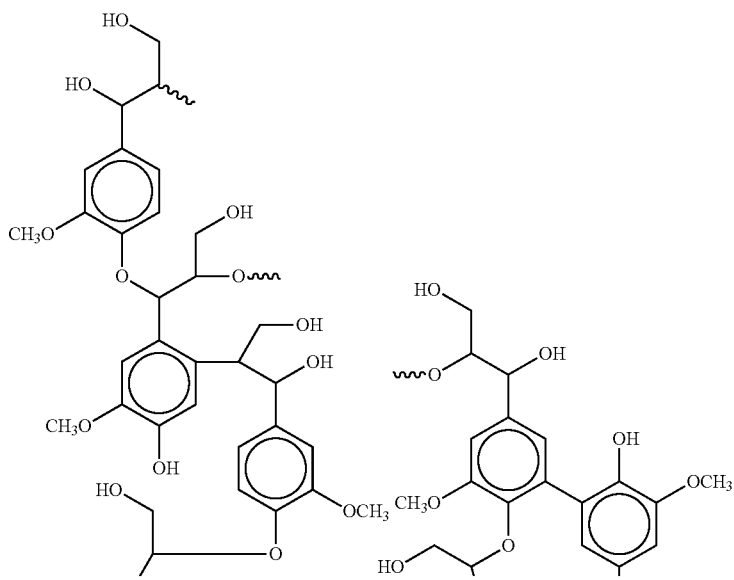
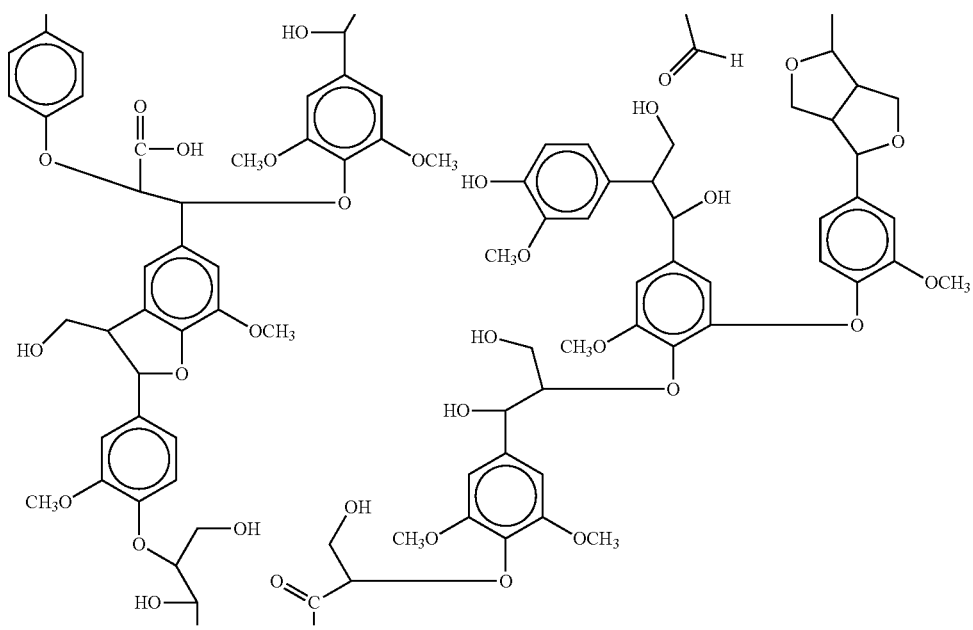
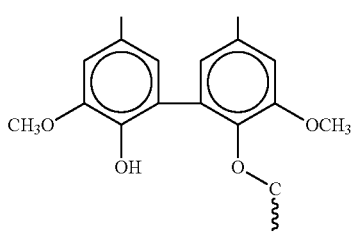

Softwood lignin fragment

Lignosulfonates are water-soluble byproducts of sulfite pulping, a treatment step during the production of paper and are common in the wood industry. In some embodiments, lignosulfonates are also soluble in organic solvents such as but not limited to dimethyl formamide and dimethyl sulfoxide. During the process of sulfite pulping, an acid source cleaves a percentage of the lignin's aromatic ether bonds. The acid cleavage of lignin to form carbocation intermediates and their subsequent reaction with bisulfite ions ($HSO_3^-$) to form sulfonated lignin is shown below wherein R is selected from —H —OH, and —$CH_3$ or another sulfonated lignin subunit:

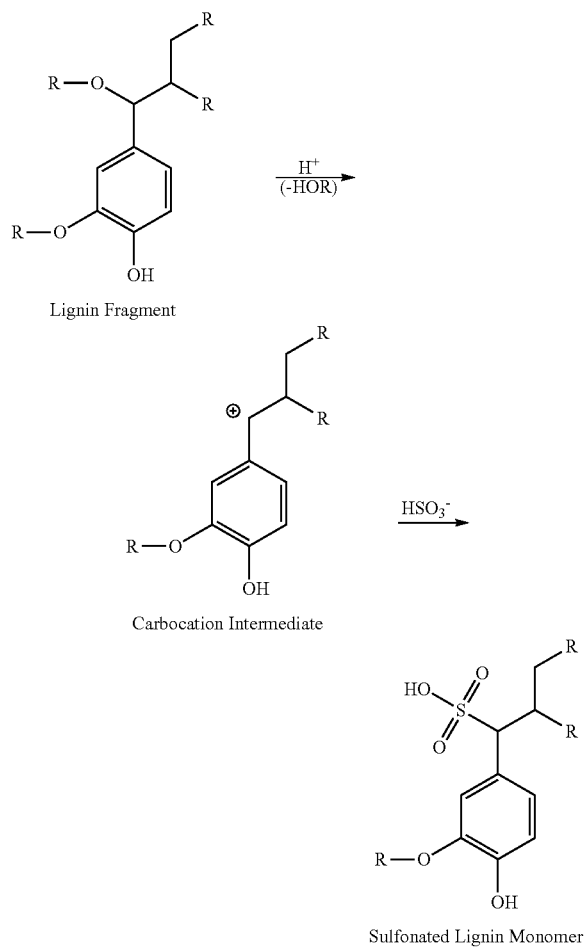

Lignin Fragment

Carbocation Intermediate

Sulfonated Lignin Monomer

In some embodiments, sulfonation occurs solely on the side chains, not on the aromatic rings, due to the nature of the above substitution reaction. In some embodiments, the resulting lignosulfonates can have very polydisperse distributions of molecular weight, ranging from 1k to 140k Daltons.

Some embodiments further comprise water. Some embodiments further comprise at least one additive selected from a thickening agent, a preservative, a colored pigment, a filler, an antioxidant, a UV absorber, a surfactant, a solvent, a tackifier, a viscosity modifier, an acidity regulator, a drying agent or a silicon compound, or any combination of the foregoing.

In some embodiments, the at least one additive is present in adhesive at about 0.01% to about 50% by weight. In some embodiments, the at least one additive is present in the adhesive at about 0.01% to about 1% by weight. In some embodiments, the at least one additive is present in the adhesive at about 0.01% to about 2% by weight. In some embodiments, the at least one additive is present in the adhesive at about 0.01% to about 5% of by weight. In some embodiments, the at least one additive is present in the adhesive at about 0.01% to about 10% by weight. In some embodiments, the at least one additive is present in the adhesive at about 0.01% to about 15% by weight. In some embodiments, the at least one additive is present in the adhesive at about 0.01% to about 20% by weight. In some embodiments, the at least one additive is present in the adhesive at about 0.01% to about 25% by weight. In some embodiments, the at least one additive is present in the adhesive at about 0.01% to about 30% by weight. In some embodiments, the at least one additive is present in the adhesive at about 0.01% to about 35% by weight. In some embodiments, the at least one additive is present in the adhesive at about 0.01% to about 40% by weight. In some embodiments, the at least one additive is present in the adhesive at about 0.01% to about 45% by weight. In some embodiments, the at least one additive is present in the adhesive at about 1% to about 5% by weight. In some embodiments, the at least one additive is present in the adhesive at about 0.01% to about 15% by weight. In some embodiments, the at least one additive is present in the adhesive at about 5% to about 10% by weight. In some embodiments, the at least one additive is present in the adhesive at about 10% to about 15% of by weight. In some embodiments, the at least one additive is present in the adhesive at about 15% to about 20% of by weight. In some embodiments, the at least one additive is present in the adhesive at about 20% to about 25% of by weight. In some embodiments, the at least one additive is present in the adhesive at about 25% to about 30% of by weight. In some embodiments, the at least one additive is present in the adhesive at about 30% to about 35% of by weight. In some embodiments, the at least one additive is present in the adhesive at about 35% to about 40% of by weight. In some embodiments, the at least one additive is present in the adhesive at about 45% to about 50% of by weight. In some embodiments, the at least one additive is present in the adhesive at about 1% to about 15% by weight. In some embodiments, the at least one additive is present in the adhesive at about 2% to about 15% by weight. In some embodiments, the at least one additive is present in the adhesive at about 5% to about 15% by weight. In some embodiments, the at least one additive is present in the adhesive at about 10% to about 15% by weight. In some embodiments, the at least one additive is present in adhesive at about 50% to about 0.01% by weight. In some embodiments, the at least one additive is present in the adhesive at about 1% to about 50% by weight. In some embodiments, the at least one additive is present in the adhesive at about 2% to about 50% by weight. In some embodiments, the at least one additive is present in the adhesive at about 5% to about 50% of by weight. In some embodiments, the at least one additive is present in the adhesive at about 10% to about 50% by weight. In some embodiments, the at least one additive is present in the adhesive at about 15% to about 50% by weight. In some embodiments, the at least one additive is present in the adhesive at about 20% to about 50% by weight. In some embodiments, the at least one additive is present in the adhesive at about 25% to about 50% by weight. In some embodiments, the at least one additive is present in the adhesive at about 30% to about 50% by weight. In some embodiments, the at least one additive is present in the adhesive at about 35% to about 50% by weight. In some embodiments, the at least one additive is present in the adhesive at about 40% to about 50% by weight. In some embodiments, the at least one additive is present in the adhesive at about 45% to about 50% by weight.

In some embodiments, the thickening agent is selected from the group consisting of viscose, poly(vinyl) alcohol, and partially hydrolyzed poly(vinyl acetate), or any combination thereof. In some embodiments, addition of a thickening agent makes the polymeric adhesive a gel, wherein a gel is defined as a colloid in which the disperse phase has combined with the dispersion medium to produce a semisolid, soft, jelly like material. In some embodiments, the gel is a hydrogel. In some embodiments, a viscous gel is desirable because it is easier to apply to the surfaces to be adhered and may have some tackiness prior to curing.

In some embodiments, the UV absorber is selected from the group consisting of a benzophenone compound, a benzotriazole compound, a salycilate compound, a substituted tolyl compound, a hindered amine compound, and a metal chelate compound, or any combination thereof.

In some embodiments, the drying agent is selected from the group consisting of diethylene glycol, glycerin, acetone, methanol, ethanol, methyl acetate, ethyl acetate, n-butanol, isobutanol, and benzoic sulfimide, or any combination thereof.

In some embodiments, the colored pigment is a metal oxide pigments or a natural pigment, or a combination thereof.

In some embodiments, the antioxidant is selected from the group consisting of a hindered phenol, a monophenol, a bisphenol, and a polyphenol antioxidant, or any combination thereof.

In some embodiments, the tackifier is selected from the group consisting of a coumarone resin, an aromatic hydrocarbon resin, a rosin resin, a terpene resin, a petroleum resin, a phenol resin, a terpene-phenol resin, an alicyclic hydrocarbon resin, a hydrogenated alicyclic hydrocarbon resin, a hydrogenated terpene resin, and a hydrogenated rosin resin, or any combination thereof.

In some embodiments, the surfactant is selected from the group consisting of an amphoteric surfactant, a nonionic surfactant, and an anionic surfactant, or any combination thereof.

In some embodiments, the acidity regulator is selected from the group consisting of an organic acid, an organic acid salt, and an organic acid anhydride, or any combination thereof.

In some embodiments, the filler is selected from the group consisting of diatomite, kaolin, bentonite, talcum powder, glass wool, rock wool, glass flour, sand, sawdust, silica fume, microsilica, silica micropowder, light calcium carbonate, activated clay, cellulose, titanium pigment, and wood fiber, or any combination thereof.

In some embodiments, the preservative is selected from the group consisting of potassium benzoate, sorbic acid, potassium sorbate, phytic acid, methylparaben, ethylparaben, propylparaben, butylparaben, ethoxyguin, dehydroacetic acid, benzoic acid, sodium benzoate, propionic acid, sodium propionate, calcium dipropionate, 5-chloro-2-methyl-4-isothiazolin-3-one, 2-methyl-4-isothiazolin-3-one, fumaric acid, dimethyl fumarate, trichloroisocyanuric acid, sodium diacetate, dodecene dicyclohexylamine, benzotriazole, copper quinolate, glycolic acid, sodium pentachlorophenolate, sodium nitrite, sodium bisulfite, sodium sulfite, cresol, p-cumylphenol, potassium benzoate, 2,2-dibromo-2-cyanoacetamide, potassium permanganate, propionic acid potassium salt, dequalinium chloride, 1,2-propanediol, 1,4-dichlorobenzene, 2-oxetanone, dichlofluanid, dichlorophen, quintozine, dimethyl fumarate, salicylic acid, sodium acetate, ethoxyquin, 2-phenoxyethanol, ethylene oxide, sodium chlorite, folpet, sodium hypochlorite, formic acid, sodium lauroylsarcosinate, phthalide, fuberidazole, sodium mercaptobenzothiazole, 2-mercaptobenzothiazole, sodium perborate, furazolidone, sodium percarbonate, pentanedial, sodium salicylate sulfadimethoxine, glycin, sulfamethazine, glyoxal, sulfamerazine, sulfamethoxazole, guaiacol, sulfameter, sulfamonomethoxine, sulfisoxazole gantrisin, bromol, hexachlorophene, 2-(thiocyanatomethylthio)benzothiazole, trichlorophenol, hydrogen peroxide, dibromodicyanobutane thiabendazole, ambam, trisodium 4-carboxy-5-mercapto-3-hydroxy-isothiazole, anilazine, thiophanate-methyl, benomyl, tribromsalan, mancozeb, triclosan, maneb, mebenil, metham-sodium, quinaldine, zinc ethylenebisdithiocarbamate, captafol, zinc bis dimethyldithiocarbamate, captan, milneb, carbendazim, carboxin, disodium ethylene-1,2-bis-dithiocarbamate, chloramphenicol, chlorotetracycline, cetrimonium pentachlorophenoxide, dihydrostreptomycin, lisozima, oxytetracycline, colistin sulfate, tetracycline, thiamphenicol, 5-chloro-2-methyl-4-isothiazolin-3-one, pentachlorophenol, chlorothalonil, pentachlorophenol copper, clotrimazole, isothiazolinones, dimethyloldimethyl hydantoin, 5-chloro-2-methyl-4-isothiazolin-3-one, 2-methyl-4-isothiazolin-3-one hydrochloride, and nisin, or any combination thereof. In some embodiments, the preservative is sodium benzoate. In some embodiments, the sodium benzoate is present in trace amounts. In some embodiments, the sodium benzoate is present at about 0.1% by weight of the adhesive.

In some embodiments, the viscosity modifier is selected from the group consisting of konjac glucomannan, xanthan gum, sodium alginate, hydroxypropyl starch, propyleneglycol alginate, gelatin, cyclohexapentylose, pectin, carrageenan, agar, gellan gum, arabic gum, tian-jing gum, carfopol resin, polyvinylpyrrolidone, dextrin, maltodextrin, chitosan, hydrolytic polymaleic anhydride, dimethyl sulfoxide, glycerol esters of wood rosin, glycerol esters of partially hydrogenated wood rosin, rosin modified maleic glyceride, hydrogenated rosin, polymerized rosin, disproportionated rosin, maleated rosin, rosin emulsion, petroleum resin emulsion, ployethylene wax, polyethylene glycol, polybutadiene, isocyanate, polyacrylamide, poly(vinyl alcohol), poly(1-butene), polyisobutylene, cellulose acetate butyrate, carboxymethyl cellulose, carboxymethylcellulose sodium, and guar gum, or any combination thereof.

In some embodiments, the solvent is selected from the group consisting of xylene, a toluene petroleum hydrocarbon, an oxygenated solvent, a chlorinated solvent, a terpene, a monochlorotoluene, a benzotrifluoride, a trans-1,2-dichloroethylene, and a hydrofluoroether, or any combination thereof. In some embodiments, the solvent is water.

Some embodiments are directed to a kit for a two-part adhesive comprising: a first container housing a first monomeric solution, the first monomeric solution comprising: a first functionalized lignosulfonate monomer, the first functionalized lignosulfonate monomer comprising a plurality of alkynyl ether functional groups; and a first component of a two-component catalyst system; and a second container housing a second monomeric solution, the second monomeric solution comprising a second functionalized lignosulfonate monomer, the second functionalized lignosulfonate monomer comprising a plurality of alkyl azide functional groups; and a second component of a two-component catalyst system; wherein the first monomeric solution and the second monomeric solution are kept separate until desired and upon mixing, crosslink to form an adhesive. In some embodiments, the first container housing and the second container housing form a single container. In some embodiments, the container is configured so as to mix the contents of the first and second container upon application to the substrates to be adhered.

In some embodiments, the first functionalized lignosulfonate monomer comprises a plurality of alkynyl ether functional groups, each independently of formula: $-O-(CH_2)_n-C{\equiv}C-H$, wherein n is an integer from 1 to 20; and the second functionalized lignosulfonate monomer comprises a plurality of alkyl azide functional groups, each independently of formula: $-O-(CH_2)_m-N_3$, wherein m is an integer from 2 to 20. In some embodiments, n is from 1 to 10, or 1 to 5, or 1 to 3. In some embodiments, n=1, n=2, n=3, n=4, n=5, n=6, n=7, n=8, n=9, n=10, n=11, n=12, n=13, n=14, n=15, n=16, n=17, n=18, n=19, or n=20. In some embodiments, m is from 2 to 10, or 2 to 5, or 2 or 3. In some embodiments, m=1, m=2, m=3, m=4, m=5, m=6, m=7, m=8, m=9, m=10, m=11, m=12, m=13, m=14, m=15, m=16, m=17, m=18, m=19, or m=20. In some embodiments, n=1 and m=2.

In some embodiments, the combination of the first and second functionalized lignosulfonate monomers results in extensive crosslinking of the monomers resulting in strong adhesive bonds between the functionalized lignosulfonate monomers. In some embodiments, the process of crosslinking between the first and second functionalized lignosulfonates monomers is catalyzed by the two-component catalytic system. In some embodiments, the two-component catalyst system is a Copper II-Ascorbic acid catalyst system.

In some embodiments, the first component of the two-component catalyst system comprises ascorbic acid. In some embodiments, the ascorbic acid is present in the first monomeric solution at about 5% to about 15% by weight. In some embodiments, the ascorbic acid is present in the first monomeric solution at about 5% to about 10% by weight. In some embodiments, the ascorbic acid is present in the first monomeric solution at about 10% to about 15% by weight.

In some embodiments, the second component of the two-component catalyst system comprises a copper (II) salt. In some embodiments, the copper (II) salt is copper (II) sulfate. In some embodiments, the copper (II) salt is present in the second monomeric solution at about 5% to about 15% by weight. In some embodiments, the copper (II) salt is present in the second monomeric solution at about 5% to about 10% by weight. In some embodiments, the copper (II) salt is present in the second monomeric solution at about 10% to about 15% by weight of the second monomeric solution.

In some embodiments, when the first and second components of the two-component catalytic system are combined, crosslinking of the functionalized lignosulfonate monomers is catalyzed. In some embodiments, the ascorbic acid reduces the copper(II) salt from a $Cu^{2+}$ to a $Cu^{1+}$ which catalyzes the crosslinking of the functionalized lignosulfonate monomers. In some embodiments, crosslinking of the functionalized lignosulfonate monomers comprises the formation of triazole covalent bonds, hydrogen bonds, Pi-Pi bonds, or combinations thereof between the functionalized lignosulfonate monomers. In some embodiments, the crosslinking of the functionalized lignosulfonate monomers may result in the formation of a 3-dimensional cross-linked lignosulfonate network of monomers with extensive binding between individual lignosulfonate monomers. In some embodiments, triazole covalent bonds may form between the alkynyl ether functional groups of the first functionalized lignosulfonate monomers and the alkyl azide functional groups of the second functionalized lignosulfonate monomers. In some embodiments, hydrogen bonding, Pi-Pi bonding, or combinations thereof may form between the lignosulfonate monomers. In some embodiments, the adhesive strength of the adhesive is primarily derived from the triazole covalent bonds formed upon crosslinking.

In some embodiments, the adhesive strength of a polymeric adhesive is determined by the number of thiazole covalent bonds formed between the functionalized lignosulfonate monomers. In some embodiments, the greater the number of thiazole bonds the stronger the adhesive strength. In some embodiments the greater the numbers of alkyl azide and alkanyl ether functional groups present on the lignosulfonate monomers, the greater the adhesive strength of the polymeric adhesive. In some embodiments, the greater the number of alkanyl ether functional groups on a first lignosulfonate monomer and the greater the alkyl azide functional groups on a particular second lignosulfonate monomer the greater the adhesive strength of the polymeric adhesive when the first and second lignosulfonate monomers are combined.

In some embodiments, standard adhesive tests can be used to determine the effectiveness of the adhesive. In some embodiments, standard adhesive tests include but are not limited to pin adhesion tests, edge crush tests, box crush tests, tension tests, compression tests, 90 and 180 degree and T peel adhesion tests, release force tests, loop tack measurement tests and combinations thereof. In some embodiments, the effectiveness of the adhesive can be tested under a variety of environmental and stress conditions including but not limited to Sheer, flexural, high and low temperature conditions and combinations thereof.

In some embodiments, at least one of the first monomeric solution and the second monomeric solution further comprises at least one additive selected from a thickening agent, a preservative, a colored pigment, a filler, an antioxidant, a UV absorber, a surfactant, a solvent, a tackifier, a viscosity modifier, an acidity regulator, a drying agent or a silicon compound, or any combination thereof.

In some embodiments, the at least one additive is present in at least one of the first monomeric solution and the second monomeric solution at about 0.01% to about 50% by weight. In some embodiments, the at least one additive the at least one additive is present in at least one of the first monomeric solution and the second monomeric solution at about 0.01% to about 1% by weight. In some embodiments, the at least one additive the at least one additive is present in at least one of the first monomeric solution and the second monomeric solution at about 0.01% to about 2% by weight. In some embodiments, the at least one additive the at least one additive is present in at least one of the first monomeric solution and the second monomeric solution at about 0.01% to about 5% by weight. In some embodiments, the at least one additive the at least one additive is present in at least one of the first monomeric solution and the second monomeric solution at about 0.01% to about 10% by weight. In some embodiments, the at least one additive the at least one additive is present in at least one of the first monomeric solution and the second monomeric solution at about 0.01% to about 15% by weight. In some embodiments, the at least one additive the at least one additive is present in at least one of the first monomeric solution and the second monomeric solution at about 0.01% to about 20% by weight. In some embodiments, the at least one additive the at least one additive is present in at least one of the first monomeric solution and the second monomeric solution at about 0.01% to about 25% by weight. In some embodiments, the at least one additive the at least one additive is present in at least one of the first monomeric solution and the second monomeric solution at about 0.01% to about 30% by weight. In some embodiments, the at least one additive the at least one additive is present in at least one of the first monomeric solution and the second monomeric solution at about 0.01% to about 35% by weight. In some embodiments, the at least one additive the at least one additive is present in at least one of the first monomeric solution and the second monomeric solution at about 0.01% to about 40% by weight. In some embodiments, the at least one additive the at least one additive is present in at least one of the first monomeric solution and the second monomeric solution at about 0.01% to about 45% by weight. In some embodiments, the at least one additive the at least one additive is present in at least one of the first monomeric solution and the second monomeric solution at about 1% to about 5% by weight. In some embodiments, the at least one additive the at least one additive is present in at least one of the first monomeric solution and the second monomeric solution at about 5% to about 10% by weight. In some embodiments, the at least one additive the at least one additive is present in at least one of the first monomeric solution and the second monomeric solution at about 10% to about 15% of the adhesive by weight. In some embodiments, the at least one additive the at least one additive is present in at least one of the first monomeric solution and the second monomeric solution at about 15% to about 20% of the adhesive by weight. In some embodiments, the at least one additive the at least one additive is present in at least one of the first monomeric solution and the second monomeric solution at about 20% to about 25% of the adhesive by weight. In some embodiments, the at least one additive the at least one additive is present in at least one of the first monomeric solution and the second monomeric solution at about 25% to about 30% of the adhesive by weight. In some embodiments, the at least one additive the at least one additive is present in at least one of the first monomeric solution and the second monomeric solution at about 30% to about 35% of the adhesive by weight. In some embodiments, the at least one additive the at least one additive is present in at least one of the first monomeric solution and the second monomeric solution at about 35% to about 40% of the adhesive by weight. In some embodiments, the at least one additive the at least one additive is present in at least one of the first monomeric solution and the second monomeric solution at about 40% to about 45% of the adhesive by weight. In some embodiments, the at least one additive the at least one additive is present in at least one of the first monomeric solution and the second monomeric solution at about 0.01% to about 50% by weight. In some embodiments, the at least one additive is present in at least one of the first monomeric solution and the second monomeric solution at about 2% to about 50% by weight. In some embodiments, the at least one additive is present in at least one of the first monomeric solution and the second monomeric solution at about 5% to about 50% by weight. In some embodiments, the at least one additive is present in at least one of the first monomeric solution and the second monomeric solution at about 10% to about 50% by weight. In some embodiments, the at least one additive is present in at least one of the first monomeric solution and the second monomeric solution at about 15% to about 50% by weight. In some embodiments, the at least one additive is present in at least one of the first monomeric solution and the second monomeric solution at about 20% to about 50% by weight. In some embodiments, the at least one additive is present in at least one of the first monomeric solution and the second monomeric solution at about 25% to about 50% by weight. In some embodiments, the at least one additive is present in at least one of the first monomeric solution and the second monomeric solution at about 30% to about 50% by weight. In some embodiments, the at least one additive is present in at least one of the first monomeric solution and the second monomeric solution at about 35% to about 50% by weight. In some embodiments, the at least one additive is present in at least one of the first monomeric solution and the second monomeric solution at about 40% to about 50% by weight. In some embodiments, the at least one additive is present in at least one of the first monomeric solution and the second monomeric solution at about 45% to about 50% by weight.

In some embodiments, the thickening agent is selected from the group consisting of viscose, poly(vinyl) alcohol, and partially hydrolyzed poly(vinyl acetate), or any combination thereof.

In some embodiments, the UV absorber is selected from the group consisting of a benzophenone compound, a benzotriazole compound, a salycilate compound, a substituted tolyl compound, a hindered amine compound, and a metal chelate compound, or any combination thereof.

In some embodiments, the drying agent is selected from the group consisting of diethylene glycol, glycerin, acetone, methanol, ethanol, industrial alcohol, methyl acetate, ethyl acetate, n-butanol, isobutanol, and benzoic sulfimide, or any combination thereof.

In some embodiments, the colored pigment is a metal oxide pigment or a natural pigment, or a combination thereof.

In some embodiments, the antioxidant is selected from the group consisting of a hindered phenol, a monophenol, a bisphenol, and a polyphenol antioxidant, or any combinations thereof.

In some embodiments, the tackifier is selected from the group consisting of a coumarone resin, an aromatic hydrocarbon resin, a rosin resin, a terpene resin, a petroleum resin, a phenol resin, a terpene-phenol resin, an alicyclic hydrocarbon resin, a hydrogenated alicyclic hydrocarbon resin, a hydrogenated terpene resin, and a hydrogenated rosin resin, or any combination thereof.

In some embodiments, the surfactant is selected from the group consisting of an amphoteric surfactant, a nonionic surfactant, and an anionic surfactant, or any combination thereof.

In some embodiments, the acidity regulator is selected from the group consisting of an organic acid, an organic acid salt, and an organic acid anhydride, or any combination thereof.

In some embodiments, the filler is selected from the group consisting of diatomite, kaolin, bentonite, talcum powder, glass wool, rock wool, glass flour, sand, sawdust, silica fume, microsilica, silica micropowder, light calcium carbonate, activated clay, cellulose, titanium pigment, and wood fiber, or any combination thereof.

In some embodiments, the preservative is selected from the group consisting of potassium benzoate, sorbic acid, potassium sorbate, phytic acid, methylparaben, ethylparaben, propylparaben, butylparaben, ethoxyguin, dehydroacetic acid, benzoic acid, sodium benzoate, propionic acid, sodium propionate, calcium dipropionate, 5-chloro-2-methyl-4-isothiazolin-3-one, 2-methyl-4-isothiazolin-3-one, fumaric acid, dimethyl fumarate, trichloroisocyanuric acid, sodium diacetate, dodecene dicyclohexylamine, benzotriazole, copper quinolate, glycolic acid, sodium pentachlorophenolate, sodium nitrite, sodium bisulfite, sodium sulfite, cresol, p-cumylphenol, potassium benzoate, 2,2-dibromo-2-cyanoacetamide, potassium permanganate, propionic acid potassium salt, dequalinium chloride, 1,2-propanediol, 1,4-dichlorobenzene, 2-oxetanone, dichlofluanid, dichlorophen, quintozine, dimethyl fumarate, salicylic acid, sodium acetate, ethoxyquin, 2-phenoxyethanol, ethylene oxide, sodium chlorite, folpet, sodium hypochlorite, formic acid, sodium lauroylsarcosinate, phthalide, fuberidazole, sodium mercaptobenzothiazole, 2-mercaptobenzothiazole, sodium perborate, furazolidone, sodium percarbonate, pentanedial, sodium salicylate sulfadimethoxine, glycin, sulfamethazine, glyoxal, sulfamerazine, sulfamethoxazole, guaiacol, sulfameter, sulfamonomethoxine, sulfisoxazole gantrisin, bromol, hexachlorophene, 2-(thiocyanatomethylthio)benzothiazole, trichlorophenol, hydrogen peroxide, dibromodicyanobutane thiabendazole, ambam, trisodium 4-carboxy-5-mercapto-3-hydroxy-isothiazole, anilazine, thiophanate-methyl, benomyl, tribromsalan, mancozeb, triclosan, maneb, mebenil, metham-sodium, quinaldine, zinc ethylenebisdithiocarbamate, captafol, zinc bis dimethyldithiocarbamate, captan, milneb, carbendazim, carboxin, disodium ethylene-1,2-bis-dithiocarbamate, chloramphenicol, chlorotetracycline, cetrimonium pentachlorophenoxide, dihydrostreptomycin, lisozima, oxytetracycline, colistin sulfate, tetracycline, thiamphenicol, 5-chloro-2-methyl-4-isothiazolin-3-one, pentachlorophenol, chlorothalonil, pentachlorophenol copper, clotrimazole, isothiazolinones, dimethyloldimethyl hydantoin, 5-chloro-2-methyl-4-isothiazolin-3-one, 2-methyl-4-isothiazolin-3-one hydrochloride, and nisin, or any combination thereof.

In some embodiments, the viscosity modifier is selected from the group consisting of konjac glucomannan, xanthan gum, sodium alginate, hydroxypropyl starch, propyleneglycol alginate, gelatin, cyclohexapentylose, pectin, carrageenan, agar, gellan gum, arabic gum, tian-jing gum, carfopol resin, polyvinylpyrrolidone, dextrin, maltodextrin, chitosan, hydrolytic polymaleic anhydride, dimethyl sulfoxide, glycerol esters of wood rosin, glycerol esters of partially hydrogenated wood rosin, rosin modified maleic glyceride, hydrogenated rosin, polymerized rosin, disproportionated rosin, maleated rosin, rosin emulsion, petroleum resin emulsion, ployethylene wax, polyethylene glycol, polybutadiene, isocyanate, polyacrylamide, poly(vinyl alcohol), poly(1-butene), polyisobutylene, cellulose acetate butyrate, carboxymethyl cellulose, carboxymethylcellulose sodium, and guar gum, or any combination thereof.

In some embodiments, the solvent is selected from the group consisting of xylene, a toluene petroleum hydrocarbon, an oxygenated solvent, a chlorinated solvent, a terpene, a monochlorotoluene, a benzotrifluoride, a trans-1,2-dichloroethylene, and a hydrofluoroether, or any combination thereof.

Some embodiments are directed to a method of synthesizing a lignosulfonate-based adhesive, the method comprising: preparing a first monomeric solution by mixing a first functionalized lignosulfonate monomer having a plurality of alkynyl ether functional groups with a first component of a two-component catalyst system; preparing a second monomeric solution by mixing a second functionalized lignosulfonate monomer having a plurality of alkyl azide functional groups with a second component of a two-component catalyst system; and maintaining the first monomeric solution and the second monomeric solution separately from one another until adhesion is desired. In some embodiments, the first monomeric solution and second monomeric solution may have a long shelf life while they are kept separate at room temperature.

In some embodiments, preparing the first monomeric solution further comprises contacting a lignosulfonate monomer with an alkynyl halide to form a first functionalized lignosulfonate monomer comprising a plurality of alkynyl ether functional groups, each independently of formula: —O—$(CH_2)_n$—C≡C—H, wherein n is an integer from 1 to 20. In some embodiments, n is from 1 to 10, or 1 to 5, or 1 to 3. In some embodiments, n=1, n=2, n=3, n=4, n=5, n=6, n=7, n=8, n=9, n=10, n=11, n=12, n=13, n=14, n=15, n=16, n=17, n=18, n=19, or n=20. In some embodiments, preparing the first monomeric solution is performed under mildly basic conditions. In some embodiments, mildly basic conditions are achieved by addition of dilute sodium hydroxide, dilute potassium hydroxide, dilute sodium carbonate, dilute potassium carbonate or a combination thereof.

In some embodiments, the alkynyl ether functional groups can be formed on the phenolic hydrogen of the lignosulfonate monomer, the sulfonate group of the lignosulfonate monomer or a combination thereof.

In some embodiments, the alkynyl halide is a terminal alkynyl halide, each independently of formula X—$(CH_2)_n$—C≡C—H where X is a halogen selected from fluorine, chlorine, bromine and iodine, and n is an integer from 1 to 20. In some embodiments, n is from 1 to 10, or 1 to 5, or 1 to 3. In some embodiments, n=1, n=2, n=3, n=4, n=5, n=6, n=7, n=8, n=9, n=10, n=11, n=12, n=13, n=14, n=15, n=16, n=17, n=18, n=19, or n=20. In some embodiments the alkynyl halide is propargyl bromide.

In some embodiments, preparing the second monomeric solution comprises contacting a second lignosulfonate monomer with an alkyl azide under conditions suitable to form a second functionalized lignosulfonate monomer comprising a plurality of alkyl azide functional groups, each independently of formula: —O—$(CH_2)_m$—$N_3$, wherein m is an integer from 2 to 20. In some embodiments, m is from 2 to 10, or 2 to 5, or 2 or 3. In some embodiments, m=1, m=2, m=3, m=4, m=5, m=6, m=7, m=8, m=9, m=10, m=11, m=12, m=13, m=14, m=15, m=16, m=17, m=18, m=19, or m=20. In some embodiments, n=1 and m=2.

In some embodiments, contacting a second lignosulfonate monomer with an alkyl azide to form a second functionalized lignosulfonate monomer further comprises: first contacting the second lignosulfonate monomer with a halogenated $C_{1-20}$alkanol in the presence of potassium carbonate; and mixing the resultant solution with a halogenating agent in an organic solvent, and sodium azide to yield the second functionalized lignosulfonate monomer comprising a plurality of second functional groups.

In some embodiments, the halogenated $C_{1-20}$alkanol is bromo-ethanol. In some embodiments, the organic solvent is dimethylformamide.

In some embodiments, the first component of the two-component catalytic system comprises ascorbic acid. In some embodiments, the ascorbic acid is present in the first monomeric solution at about 5% to about 15% by weight. In some embodiments, the ascorbic acid is present in the first monomeric solution at about 5% to about 10% by weight. In some embodiments, the ascorbic acid is present in the first monomeric solution at about 10% to about 15% by weight.

In some embodiments, the second component of the two-component catalytic system is a copper (II) salt. In some embodiments, the copper (II) salt is present in the second monomeric solution at about 5% to about 15% by weight. In some embodiments, the copper (II) salt is present in the second monomeric solution at about 5% to about 10% by weight. In some embodiments, the copper (II) salt comprises about 10% to about 15% by weight of the second monomeric solution.

In some embodiments, the presence of the copper (II) salt may confer a distinct color to the monomeric solution. In some embodiments, the Copper (II) salt is copper sulfate, which may confer to the solution a slight blue color. In some embodiments, the color dissipates when the first and second monomeric solutions are mixed to form the adhesive. In some embodiments, the color conferred by the presence of the copper (II) salt can be used to distinguish the first and second solutions.

In some embodiments, the polymeric adhesive may have advantages over currently available adhesives. In some embodiments, the polymeric adhesive has great versatility, being capable of bonding a wide variety of substrates including metallic, ceramic, glass and organic substrates. Suitable metallic substrates include any of the common structural metals including, but not limited to, iron, steel, including stainless steel, lead, aluminum, copper, brass, bronze, Monel metal, nickel and zinc. Suitable organic substrates include, but are not limited to, leather and all common textile materials such as polyester, polyamide, rayon and cotton fabrics and cords. Suitable textile substrates also include, but are not limited to, glass fibers and or filaments. In some embodiments, substrates may also include a variety of elastomers. In some embodiments, suitable elastomers include, but are not limited to, natural rubber, styrene butadiene rubber of both high and low durometer grades and oil extended types, neoprene (G and W types), butyl runner, chlorobutyl rubber, ethylene-propylene terpolymer rubber, butadiene-acrylonitrile rubber, chlorosulfonated plyethylene rubber, polyurethane rubber, polyacrylate rubber and ethylene-propylene copolymer rubber. In some embodiments, the polymeric adhesive provides good bond strength.

In some embodiments, the only by-products of this reaction are the original reaction mixture, the original solvent, copper(II) salt, ascorbic acid or a combination thereof. In some embodiments, the absence of VOC emissions during the formation of the adhesive makes it environmentally friendly.

Some embodiments are directed to a method of adhering a first surface to a second surface, the method comprising: combining a first monomeric solution with a second monomeric solution to form a mixture; applying the mixture to the first surface; contacting the second surface with the mixture on the first surface; and allowing the mixture to cure thereby adhering the first surface to the second surface.

In some embodiments, the first monomeric solution comprises a functionalized lignosulfonate monomer comprising a plurality of alkynyl ether functional groups, each independently of formula: $-O-(CH_2)_n-C{\equiv}C-H$, wherein n is an integer from 1 to 20, and a first component of a two-component catalyst system. In some embodiments, n is from 1 to 10, or 1 to 5, or 1 to 3. In some embodiments, n=1, n=2, n=3, n=4, n=5, n=6, n=7, n=8, n=9, n=10, n=11, n=12, n=13, n=14, n=15, n=16, n=17, n=18, n=19, or n=20.

In some embodiments, the second monomeric solution comprises a functionalized lignosulfonate monomer comprising a plurality of alkyl azide functional groups, each independently of formula: $-O-(CH_2)_m-N_3$, wherein m is an integer from 2 to 20; and a second component of a two-component catalyst system. In some embodiments, m is from 2 to 10, or 2 to 5, or 2 or 3. In some embodiments, m=1, m=2, m=3, m=4, m=5, m=6, m=7, m=8, m=9, m=10, m=11, m=12, m=13, m=14, m=15, m=16, m=17, m=18, m=19, or m=20.

In some embodiments, the first monomeric solution and the second monomeric solution are mixed prior to applying to a surface. In some embodiments, the mixture can be applied to the first surface, the second surface or a combination thereof prior to contacting the first surface and second surface. In some embodiments, the first monomeric solution and the second monomeric solution are not mixed prior to applying to the first surface and second surface respectively. In some embodiments, the first monomeric solution is applied to the first surface and the second monomeric solution is applied to the second surface followed by contacting the first and second surfaces allowing the first monomeric solution and second monomeric solution to mix; and allowing the mixture to cure thereby adhering the first surface to the second surface.

In some embodiments, the first component of the two-component catalyst system is ascorbic acid. In some embodiments, the ascorbic acid is present in the first monomeric solution at about 5% to about 15% by weight. In some embodiments, the ascorbic acid is present in the first monomeric solution at about 5% to about 10% by weight. In some embodiments, the ascorbic acid is present in the first monomeric solution at about 10% to about 15% by weight.

In some embodiments, the second component of the two-component catalyst system is a copper (II) salt. In some embodiments, the copper (II) salt is present in the second monomeric solution at about 5% to about 15% by weight. In some embodiments, the copper (II) salt is present in the second monomeric solution at about 5% to about 10% by weight. In some embodiments, the copper (II) salt is present in the second monomeric solution at about 10% to about 15% by weight.

In some embodiments, the first monomeric solution and the second monomeric solution are present at a ratio of about 2:1 to about 1:2. In some embodiments, the first monomeric solution and the second monomeric solution are present at a ratio of about 3:1 to about 1:3. In some embodiments, the first monomeric solution and the second monomeric solution are present at a ratio of about 4:1 to about 1:4. In some embodiments, the first monomeric solution and the second monomeric solution are present at a ratio of about 5:1 to about 1:5. In some embodiments, the first monomeric solution and the second monomeric are present at a ratio of about 1:1.

In some embodiments, allowing the mixture to cure comprises maintaining the mixture at about 10° C. to about 40° C. for at least about 5 minutes. In some embodiments, allowing the mixture to cure comprises maintaining the mixture at about 20° C. to about 30° C. for at least about 8 minutes. In some embodiments, allowing the mixture to cure comprises maintaining the mixture at about 25° C. for at least about 10 minutes. In some embodiments, allowing the mixture to cure comprises maintaining the mixture at about 25° C. for about 10 minutes. In some embodiments, allowing the mixture to cure comprises maintaining the mixture at about 25° C. for about 20 minutes. In some embodiments, allowing the mixture to cure comprises maintaining the mixture at about 25° C. for about 30 minutes. In some embodiments, allowing the mixture to cure comprises maintaining the mixture at about 25° C. for about 40 minutes. In some embodiments, allowing the mixture to cure comprises maintaining the mixture at about 25° C. for about 50 minutes. In some embodiments, allowing the mixture to cure comprises maintaining the mixture at about 25° C. for about 60 minutes. In some embodiments, allowing the mixture to cure comprises maintaining the mixture at about 25° C. for about 70 minutes. In some embodiments, allowing the mixture to cure comprises maintaining the mixture at about 25° C. for about 80 minutes. In some embodiments, allowing the mixture to cure comprises maintaining the mixture at about 25° C. for about 90 minutes. In some embodiments, allowing the mixture to cure comprises maintaining the mixture at about 25° C. for about 100 minutes. In some embodiments, allowing the mixture to cure comprises maintaining the mixture at about 25° C. for about 110 minutes. In some embodiments, allowing the mixture to cure comprises maintaining the mixture at about 25° C. for about 120 minutes. In some embodiments, allowing the mixture to cure comprises allowing the solvents in the mixture to evaporate. In some embodiments, the solvent is water.

In addition, tests can be performed to analyze the characteristics of the polymeric adhesive while the adhesive is in the liquid or gel stage. Such tests may measure viscosity and solubility of the adhesive. The viscosity of an adhesive in the liquid phase can be measured by observing the rate of flow of a sample of an adhesive from one container to another positioned below the first container such that adhesive will flow in a constant stream under the force of gravity. The viscosity of an adhesive containing an additive can be compared directly to the other adhesives while both adhesives are in the liquid or gel phase. More sophisticated measurement devices exist to obtain a quantitative comparison of the viscosity of an adhesive in the liquid or gel phase. These include falling and oscillatory piston viscometers, Stabinger and Stormert rotational viscometers which can be used if a particular liquid or gel phase adhesive is characterized a Newtonian fluid. Where the adhesive in liquid or gel phase represents a non-Newtonian fluid then instruments including rheometers and plastometers can be used to measure viscosity of a particular adhesive.

Additional tests can be performed to measure the performance of a polymeric adhesive. Such tests might include exposure of the cured adhesive to a range of temperatures and pressures to mimic the conditions in which the adhesive would be used. Another characteristic that can be readily measured is the performance of a polymeric adhesive after varying amounts of exposure to sunlight. These conditions can be replicated under laboratory conditions by exposing the cured adhesive to varying amounts of ultraviolet light for a variety of durations and then performing the tests described above.

Solubility of a water-based adhesive is an important feature that can be enhanced in the presence of an additive. To measure solubility of an adhesive powder in water, light or laser refraction can be used to measure the presence of particles of un-dissolved adhesive. A specified amount of adhesive can be added to a measured amount of water and the relative light or laser refraction can be measured as a surrogate for solubility of the powdered adhesive. This method permits the comparison of the solubility of a particular adhesive in the presence or absence of an additive. An alternative method for measuring the solubility of measured amounts of an adhesive with and without an additive is to measure adhesive sedimentation after application of a mild centrifugal force to the adhesive-water mixture. It is expected that higher levels of sedimentation are correlated with lower levels of solubility of the Adhesive.

EXAMPLES

Example 1

Synthesis of Functionalized Lignosulfonate Monomers

The synthesis of functionalized lignosulfonate monomers is a multistep process. The first step in a representative process involves contacting lignosulfonate with, for example, propargyl bromide in the presence of, for example, potassium carbonate to form a lignosulfonate with pendent propargyl ethers (1). Replacement of propargyl bromide and potassium carbonate with appropriate materials can be performed by the skilled artisan. The lignosulfonate with pendent propargyl ethers is combined with, for example, 5% ascorbic acid by weight and, for example, 5-10% viscose by weight and combined with water to form Monomer A as a gel as shown below:

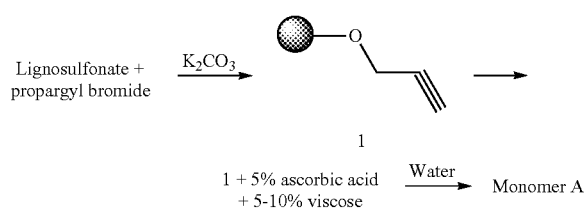

The lignosulfonate is contacted with, for example, 2-bromoethanol under mildly acidic conditions followed by treatment with, for example, phosphorous bromide in dimethyl formamide. This is followed by addition of, for example, sodium azide to form a lignosulfonate with pendent alkyl azide functional groups (2). The lignosulfonate with pendent alkyl azide functional groups is combined with, for example, 5% copper sulfate by weight and 5-10% viscose by weight and combined with water to form Monomer B as a gel as shown below:

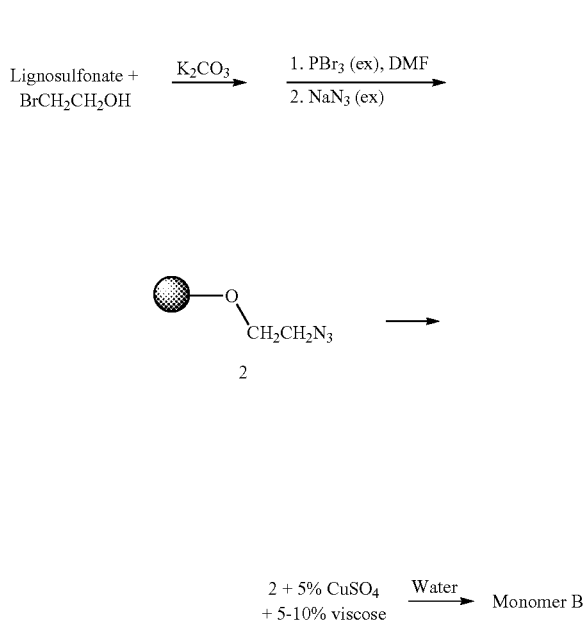

Example 2

Preparation and Use of a Polymeric Adhesive

Monomer A as a gel (Part A) is kept in a first container and monomer B as a gel (Part B) is kept in a second container. Monomer A as a gel (Part A) is kept in a first container and monomer B as a gel (Part B) is kept in a second container until they are combined as follows. Monomer A as a gel (Part A) and monomer B as a gel (Part B) are combined in equal amounts to form a polymeric adhesive and applied to a first surface of two surfaces to be adhered together. A second surface of the two surfaces to be adhered together is then contacted with the first surface bringing the polymeric adhesive into contact with the second surface. Mild pressure and manipulation is then applied to position the two surfaces into the desired configuration and the polymeric adhesive is allowed to dry, allowing the water present in the polymeric adhesive to evaporate thereby adhering the first surface to the second surface in the desired configuration.

Example 3

Polymeric Adhesive Formulation

Exemplary polymeric adhesive formulations may be prepared having the compositions set forth in table 1 below.

TABLE 1

|  | Material | % weight | | | |
| --- | --- | --- | --- | --- | --- |
|  |  | Formula 1 | Formula 2 | Formula 3 | Formula 4 |
| Part A (Monomer A as a gel) | Lignosulfonate (with pendent propargyl ethers) | 79.9 | 78.9 | 76.9 | 74.9 |
|  | Ascorbic acid | 5 | 6 | 8 | 10 |
|  | Viscose | 5 | 5 | 5 | 5 |
|  | Sodium Benzoate | 0.1 | 0.1 | 0.1 | 0.1 |
|  | Water | 10 | 10 | 10 | 10 |
| Part B (Monomer B as a gel) | Lignosulfonate (with pendent alkyl azide functional groups) | 79.9 | 78.9 | 76.9 | 74.9 |
|  | Copper sulfate | 5 | 6 | 8 | 10 |
|  | Viscose | 5 | 5 | 5 | 5 |
|  | Sodium Benzoate | 0.1 | 0.1 | 0.1 | 0.1 |
|  | Water | 10 | 10 | 10 | 10 |

Example 4

Preparation and Use of a Polymeric Adhesive

Monomer A as a gel (part A) is applied to a first surface of two surfaces to be adhered together. Monomer B as a gel (Part B) is then applied to a second surface of the two surfaces to be adhered together. The first and second surfaces are contacted together bringing part A into contact with part B and forming a polymeric adhesive that is now in contact with both the first and second surfaces. Mild pressure and manipulation is then applied to position the two surfaces into the desired configuration and to ensure that the two gels comprising the polymeric adhesive are thoroughly mixed. The polymeric adhesive is then allowed to dry, allowing the water present in the polymeric adhesive to evaporate thereby adhering the first surface to the second surface in the desired configuration.

Example 5

Preparation and Use of a Polymeric Adhesive

Monomer A as a gel (part A) is first combined with Monomer B as a gel (Part B) bringing part A into contact with part B and forming a polymeric adhesive. The mixture is then applied to a first surface of two surfaces to be adhered together. The first and second surfaces are contacted together both the first and second surfaces. Mild pressure and manipulation is then applied to position the two surfaces into the desired configuration and to ensure that the two gels comprising the polymeric adhesive are thoroughly mixed. The polymeric adhesive is then allowed to dry, allowing the water present in the polymeric adhesive to evaporate thereby adhering the first surface to the second surface in the desired configuration.

Example 6

Testing the Properties of a Polymeric Adhesive

The properties of a particular polymeric adhesive can be established and compared with those of other adhesives by a number of standard testing methodologies including peel, tension, compression and sheer tests. These tests measure the strength of a cured adhesive and its ability to withstand a variety of stresses that can be encountered in its use. A peel test will measure the force required to separate to two adhered substrates, for example two pieces or fabric or two pieces of cardboard, in terms of the force, angle and time required to achieve separation of the adhesive from the substrates. A peel test will provide an indication of the level of stress required before a particular adhesive fails and separates from a substrate. Tension, compression and sheer tests allow for the characterization of adhesion provided by a particular adhesive and the forces required to cause separation of the adhesive from a substrate or separation of two substrates adhered together. These tests will permit a user to evaluate the differences in strength of an adhesive with and without an additive.

What is claimed is:

1. A polymeric adhesive comprising:
a first functionalized lignosulfonate monomer comprising a plurality of first functional groups, wherein each member of the plurality of first functional groups independently comprises alkynyl ethers of formula: —O—$(CH_2)_n$—C≡C—H, wherein n is an integer from 1 to 20;
a second functionalized lignosulfonate monomer comprising a plurality of second functional groups, wherein each member of the plurality of second functional groups independently comprises an alkyl azide of formula: —O—$(CH_2)_m$—$N_3$, wherein m is an integer from 2 to 20;
wherein the plurality of first functional groups crosslink with the plurality of second functional groups to form the polymeric adhesive.

2. The adhesive of claim 1, further comprising water.

3. The adhesive of claim 1, further comprising at least one additive selected from a thickening agent, a preservative, a colored pigment, a filler, an antioxidant, a UV absorber, a surfactant, a solvent, a tackifier, a viscosity modifier, an acidity regulator, a drying agent or a silicon compound.

4. The adhesive of claim 3, wherein the at least one additive comprises about 0.01% to about 15% of the adhesive by weight.

5. A kit for a two-part adhesive comprising:
a first container housing a first monomeric solution, the first monomeric solution comprising: a first functionalized lignosulfonate monomer, the first functionalized lignosulfonate monomer comprising a plurality of alkynyl ether functional groups each independently of formula: —O—$(CH_2)_n$—C≡C—H, wherein n is an integer from 1 to 20; and a first component of a two-component catalyst system;
a second container housing a second monomeric solution, the second monomeric solution comprising a second functionalized lignosulfonate monomer, the second functionalized lignosulfonate monomer comprising a plurality of alkyl azide functional groups each independently of formula: —O—(CH$_2$)$_m$—N$_3$, wherein m is an integer from 2 to 20; and a second component of a two-component catalyst system; and wherein the first monomeric solution and the second monomeric solution are kept separate until desired, and upon mixing, the plurality of first functional groups crosslink with the plurality of second functional groups to form the adhesive.

6. The kit of claim 5, wherein the two-component catalyst system is a Copper II-Ascorbic acid catalyst system wherein the first component of the two-component catalyst system comprises ascorbic acid and the second component of the two-component catalyst system comprises a copper (II) salt.

7. The kit of claim 6, wherein the ascorbic acid comprises about 5% to about 15% by weight of the first monomeric solution.

8. The kit of claim 6, wherein the copper (II) salt comprises about 5% to about 15% by weight of the second monomeric solution.

9. The kit of claim 5, wherein at least one of the first monomeric solution and the second monomeric solution further comprises at least one additive selected from a thickening agent, a preservative, a colored pigment, a filler, an antioxidant, a UV absorber, a surfactant, a solvent, a tackifier, a viscosity modifier, an acidity regulator, a drying agent or a silicon compound.

10. The kit of claim 9, wherein the at least one additive comprises about 0.01% to about 15% by weight of at least one of the first monomeric solution and the second monomeric solution.

11. A method of synthesizing a lignosulfonate-based adhesive, the method comprising:
preparing a first monomeric solution by mixing a first functionalized lignosulfonate monomer having a plurality of alkynyl ether functional groups each independently of formula: —O—(CH$_2$)$_n$—C≡C—H, wherein n is an integer from 1 to 20, with a first component of a two-component catalyst system;
preparing a second monomeric solution by mixing a second functionalized lignosulfonate monomer having a plurality of alkyl azide functional groups each independently of formula: —O—(CH$_2$)$_m$—N$_3$, wherein m is an integer from 2 to 20, with a second component of a two-component catalyst system; and
maintaining the first monomeric solution and the second monomeric solution separately from one another until adhesion is desired.

12. The method of claim 11, wherein preparing the first monomeric solution further comprises contacting a lignosulfonate monomer with an alkynyl halide to form the first functionalized lignosulfonate monomer.

13. The method of claim 11, wherein the first component of the two-component catalytic system comprises ascorbic acid and wherein the second component of the two-component catalytic system is a copper (II) salt.

14. The method of claim 13, wherein the ascorbic acid comprises about 5% to about 15% by weight of the first monomeric solution.

15. The method of claim 12, wherein the alkynyl halide is a terminal alkynyl halide of formula X—(CH$_2$)$_n$—C≡C—H where X is a halogen selected from fluorine, chlorine, bromine and iodine, and n is an integer from 1 to 20.

16. The method of claim 11, wherein preparing the second monomeric solution comprises contacting a second lignosulfonate monomer with an alkyl azide under conditions suitable to form the second functionalized lignosulfonate monomer.

17. The method of claim 13, wherein the copper (II) salt comprises about 5% to about 15% by weight of the second monomeric solution.

18. The method of claim 16, wherein contacting the second lignosulfonate monomer with the alkyl azide to form the second functionalized lignosulfonate monomer further comprises:
first contacting the second lignosulfonate monomer with a halogenated C$_{1-20}$ alkanol in the presence of potassium carbonate; and
mixing the resultant solution with a halogenating agent in an organic solvent, and sodium azide to yield the second functionalized lignosulfonate monomer comprising a plurality of second functional groups.

19. A method of adhering a first surface to a second surface, the method comprising:
combining a first monomeric solution with a second monomeric solution to form a mixture wherein:
the first monomeric solution comprises a first functionalized lignosulfonate monomer comprising a plurality of alkynyl ether functional groups, each independently of formula: —O—(CH$_2$)$_n$—C≡C—H, wherein n is an integer from 1 to 20, and a first component of a two-component catalyst system; and
the second monomeric solution comprises a second functionalized lignosulfonate monomer comprising a plurality of alkyl azide functional groups, each independently of formula: —O—(CH$_2$)$_m$—N$_3$, wherein m is an integer from 2 to 20, and a second component of a two-component catalyst system;
applying the mixture to at least one of the first surface and the second surface;
contacting the other of the first surface and the second surface with the mixture on the at least one of the first surface and the second surface; and
allowing the mixture to cure to crosslink the plurality of first functional groups with the plurality of second functional groups thereby adhering the first surface to the second surface.

20. The adhesive of claim 1, wherein n=1 and m=2.

21. The adhesive of claim 1, further comprising at least one thickening agent selected from the group consisting of viscose, poly(vinyl) alcohol, and partially hydrolyzed poly(vinyl acetate), or any combination thereof.

22. The adhesive of claim 1, further comprising at least one UV absorber selected from the group consisting of a benzophenone compound, a benzotriazole compound, a salicylate compound, a substituted tolyl compound, a hindered amine compound, and a metal chelate compound, or any combination thereof.

23. The adhesive of claim 1, further comprising at least one drying agent selected from the group consisting of diethylene glycol, glycerin, acetone, methanol, ethanol, methyl acetate, ethyl acetate, n-butanol, isobutanol, and benzoic sulfimide, or any combination thereof.

24. The adhesive of claim 1, further comprising at least one colored pigment selected from the group consisting of a metal oxide pigment and a natural pigment, or a combination thereof.

25. The adhesive of claim 1, further comprising at least one antioxidant selected from the group consisting of a hindered phenol, a monophenol, a bisphenol, and a polyphenol antioxidant, or any combination thereof.

26. The adhesive of claim 1, further comprising at least one tackifier selected from the group consisting of a coumarone resin, an aromatic hydrocarbon resin, a rosin resin, a terpene resin, a petroleum resin, a phenol resin, a terpene-phenol resin, a alicyclic hydrocarbon resin, a hydrogenated alicyclic hydrocarbon resin, a hydrogenated terpene resin, and a hydrogenated rosin resin, or any combination thereof.

27. The adhesive of claim 1, further comprising at least one surfactant selected from the group consisting of an amphoteric surfactant, a nonionic surfactant, and an anionic surfactant, or any combination thereof.

28. The adhesive of claim 1, further comprising at least one acidity regulator selected from the group consisting of an organic acid, an organic acid salt, and an organic acid anhydride, or any combination thereof.

29. The adhesive of claim 1, further comprising at least one filler selected from the group consisting of diatomite, kaolin, bentonite, talcum powder, glass wool, rock wool, glass flour, sand, sawdust, silica fume, microsilica, silica micropowder, light calcium carbonate, activated clay, cellulose, titanium pigment, and wood fiber, or any combination thereof.

30. The adhesive of claim 1, further comprising at least one preservative selected from the group consisting of potassium benzoate, sorbic acid, potassium sorbate, phytic acid, methylparaben, ethylparaben, propylparaben, butylparaben, ethoxyguin, dehydroacetic acid, benzoic acid, sodium benzoate, propionic acid, sodium propionate, calcium dipropionate, 5-chloro-2-methyl-4-isothiazolin-3-one, 2-methyl-4-isothiazolin-3-one, fumaric acid, dimethyl fumarate, trichloroisocyanuric acid, sodium diacetate, dodecene dicyclohexylamine, benzotriazole, copper quinolate, glycolic acid, sodium pentachlorophenolate, sodium nitrite, sodium bisulfite, sodium sulfite, cresol, p-cumylphenol, potassium benzoate, 2,2-dibromo-2-cyanoacetamide, potassium permanganate, propionic acid potassium salt, dequalinium chloride, 1,2-propanediol, 1,4-dichlorobenzene, 2-oxetanone, dichlofluanid, dichlorophen, quintozine, dimethyl fumarate, salicylic acid, sodium acetate, ethoxyquin, 2-phenoxyethanol, ethylene oxide, sodium chlorite, folpet, sodium hypochlorite, formic acid, sodium lauroylsarcosinate, phthalide, fuberidazole, sodium mercaptobenzothiazole, 2-mercaptobenzothiazole, sodium perborate, furazolidone, sodium percarbonate, pentanedial, sodium salicylate sulfadimethoxine, glycin, sulfamethazine, glyoxal, sulfamerazine, sulfamethoxazole, guaiacol, sulfameter, sulfamonomethoxine, sulfisoxazole gantrisin, bromol, hexachlorophene, 2-(thiocyanatomethylthio)benzothiazole, trichlorophenol, hydrogen peroxide, dibromodicyanobutane thiabendazole, ambam, trisodium 4-carboxy-5-mercapto-3-hydroxy-isothiazole, anilazine, thiophanate-methyl, benomyl, tribromsalan, mancozeb, triclosan, maneb, mebenil, metham-sodium, quinaldine, zinc ethylenebisdithiocarbamate, captafol, zinc bis dimethyldithiocarbamate, captan, milneb, carbendazim, carboxin, disodium ethylene-1,2-bisdithiocarbamate, chloramphenicol, chlorotetracycline, cetrimonium pentachlorophenoxide, dihydrostreptomycin, lisozima, oxytetracycline, colistin sulfate, tetracycline, thiamphenicol, 5-chloro-2-methyl-4-isothiazolin-3-one, pentachlorophenol, chlorothalonil, pentachlorophenol copper, clotrimazole, isothiazolinones, dimethyloldimethyl hydantoin, 5-chloro-2-methyl-4-isothiazolin-3-one, 2-methyl-4-isothiazolin-3-one hydrochloride, and nisin, or any combination thereof.

31. The adhesive of claim 1, further comprising at least one viscosity modifier selected from the group consisting of konjac glucomannan, xanthan gum, sodium alginate, hydroxypropyl starch, propyleneglycol alginate, gelatin, cyclohexapentylose, pectin, carrageenan, agar, gellan gum, arabic gum, tian-jing gum, carfopol resin, polyvinylpyrrolidone, dextrin, maltodextrin, chitosan, hydrolytic polymaleic anhydride, dimethyl sulfoxide, glycerol esters of wood rosin, glycerol esters of partially hydrogenated wood rosin, rosin modified maleic glyceride, hydrogenated rosin, polymerized rosin, disproportionated rosin, maleated rosin, rosin emulsion, petroleum resin emulsion, ployethylene wax, polyethylene glycol, polybutadiene, isocyanate, polyacrylamide, poly(vinyl alcohol), poly(1-butene), polyisobutylene, cellulose acetate butyrate, carboxymethyl cellulose, carboxymethylcellulose sodium, and guar gum, or any combination thereof.

32. The adhesive of claim 1, further comprising at least one solvent selected from the group consisting of xylene, a toluene petroleum hydrocarbon, an oxygenated solvent, a chlorinated solvent, a terpene, a monochlorotoluene, a benzotrifluoride, a trans-1,2-dichloroethylene, and a hydrofluorether, or any combination thereof.

\* \* \* \* \*

UNITED STATES PATENT AND TRADEMARK OFFICE
CERTIFICATE OF CORRECTION

Page 1 of 2

PATENT NO. : 8,859,707 B2
APPLICATION NO. : 13/509321
DATED : October 14, 2014
INVENTOR(S) : Brizius It is certified that error appears in the above-identified patent and that said Letters Patent is hereby corrected as shown below:

On the Title Page, Item (56), under "OTHER PUBLICATIONS", in Column 1, Line 19, delete "Room-Temperative" and insert -- Room-Temperature --, therefor.

On Title Page 2, in Item (56), under "OTHER PUBLICATIONS", in Column 1, Line 1, delete "at," and insert -- al., --, therefor.

In the Specification

In Columns 5 and 6, Lines 18-49, delete the entire structure, and replace with the following structure.

Signed and Sealed this
Twenty-eighth Day of July, 2015

Michelle K. Lee
*Director of the United States Patent and Trademark Office*

CERTIFICATE OF CORRECTION (continued)
U.S. Pat. No. 8,859,707 B2 insert --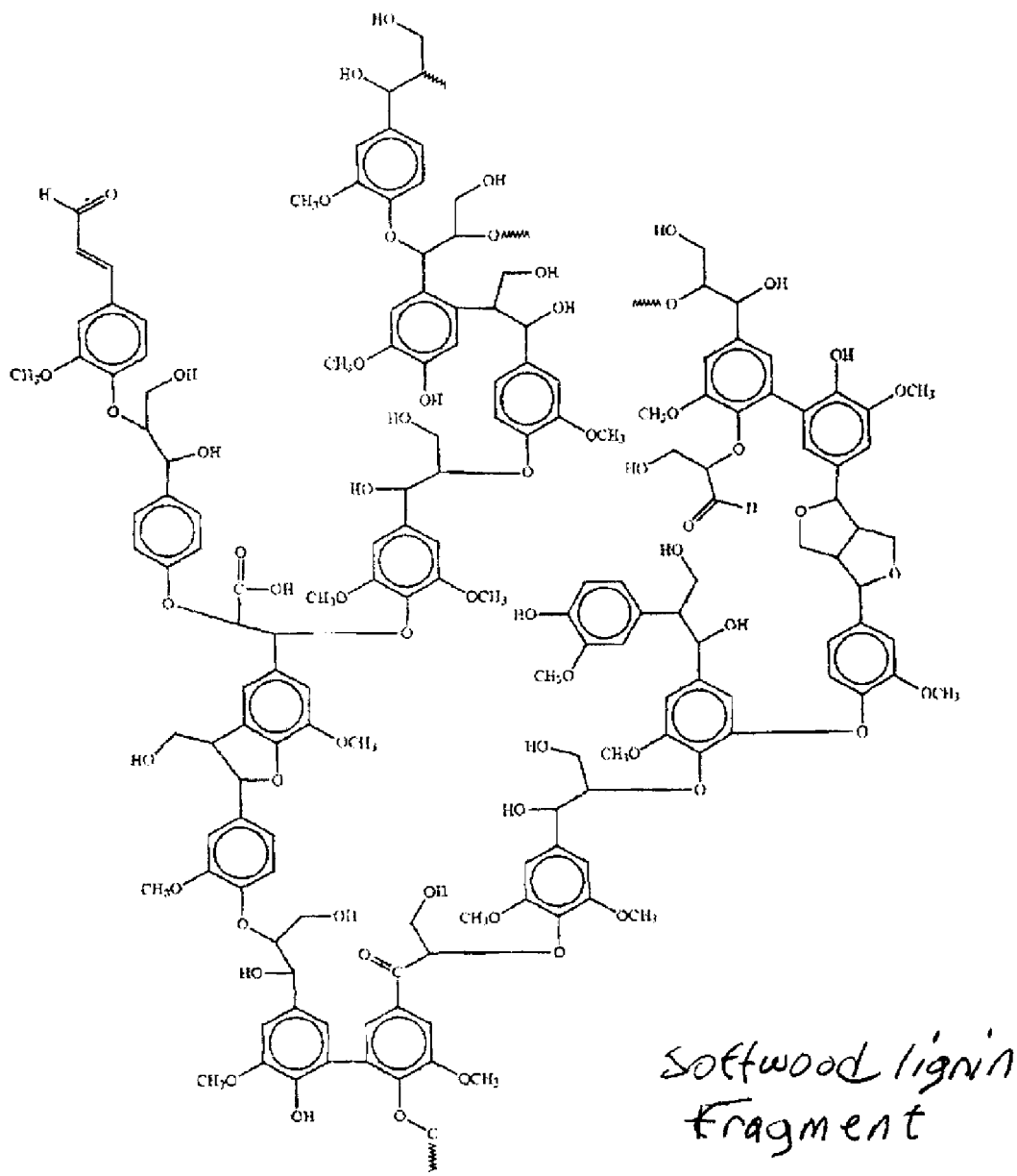--.

In Column 10, Line 31, delete "ployethylene" and insert -- polyethylene --, therefor.

In Column 15, Line 24, delete "ployethylene" and insert -- polyethylene --, therefor.

In Column 17, Line 11, delete "plyethylene" and insert -- polyethylene --, therefor.

In Column 19, Lines 34-35, delete "Adhesive." and insert -- adhesive. --, therefor.

In the Claims

In Column 26, Line 30, in Claim 31, delete "ployethylene" and insert -- polyethylene --, therefor.